United States Patent
Tang et al.

(10) Patent No.: US 10,036,818 B2
(45) Date of Patent: Jul. 31, 2018

(54) ACCELERATING FULL WAVEFIELD INVERSION WITH NONSTATIONARY POINT-SPREAD FUNCTIONS

(71) Applicants: Yaxun Tang, Houston, TX (US); Sunwoong Lee, Houston, TX (US)

(72) Inventors: Yaxun Tang, Houston, TX (US); Sunwoong Lee, Houston, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 797 days.

(21) Appl. No.: 14/330,767

(22) Filed: Jul. 14, 2014

(65) Prior Publication Data

US 2015/0073755 A1    Mar. 12, 2015

Related U.S. Application Data

(60) Provisional application No. 61/874,574, filed on Sep. 6, 2013.

(51) Int. Cl.
*G01V 1/28*     (2006.01)
*G06F 17/50*    (2006.01)

(52) U.S. Cl.
CPC .......... *G01V 1/28* (2013.01); *G06F 17/5009* (2013.01); *G01V 2210/66* (2013.01); *G06F 2217/16* (2013.01)

(58) Field of Classification Search
CPC .................................................. G01V 2210/66
See application file for complete search history.

(56) References Cited

U.S. PATENT DOCUMENTS 3,812,457 A    5/1974 Weller
3,864,667 A    2/1975 Bahjat
(Continued)

FOREIGN PATENT DOCUMENTS

CA    2 796 631    11/2011
EP    1 094 338    4/2001
(Continued)

OTHER PUBLICATIONS

Nocedal et al., "Numerical Optimization," 2nd Edition (2006), pp. 1-664 [retrieved from http://link.springer.com/book/10.1007%2F978-0-387-40065-5].*

(Continued)

*Primary Examiner* — Brian W Wathen
(74) *Attorney, Agent, or Firm* — ExxonMobil Upstream Research Company Law Department (57) ABSTRACT

Method for reducing computational time in inversion of geophysical data to infer a physical property model (91), especially advantageous in full wavefield inversion of seismic data. An approximate Hessian is pre-calculated by computing the product of the exact Hessian and a sampling vector composed of isolated point diffractors (82), and the approximate Hessian is stored in computer hard disk or memory (83). The approximate Hessian is then retrieved when needed (99) for computing its product with the gradient (93) of an objective function or other vector. Since the approximate Hessian is very sparse (diagonally dominant), its product with a vector may therefore be approximated very efficiently with good accuracy. Once the approximate Hessian is computed and stored, computing its product with a vector requires no simulator calls (wavefield propagations) at all. The pre-calculated approximate Hessian can also be reused in the subsequent steps whenever necessary.

24 Claims, 6 Drawing Sheets

(56) References Cited

U.S. PATENT DOCUMENTS

| | | |
|---|---|---|
| 4,159,463 A | 6/1979 | Silverman |
| 4,168,485 A | 9/1979 | Payton et al. |
| 4,545,039 A | 10/1985 | Savit |
| 4,562,650 A | 1/1986 | Nagasawa et al. |
| 4,575,830 A | 3/1986 | Ingram et al. |
| 4,594,662 A | 6/1986 | Devaney |
| 4,636,957 A | 1/1987 | Vannier et al. |
| 4,675,851 A | 6/1987 | Savit et al. |
| 4,686,654 A | 8/1987 | Savit |
| 4,707,812 A | 11/1987 | Martinez |
| 4,715,020 A | 12/1987 | Landrum, Jr. |
| 4,766,574 A | 8/1988 | Whitmore et al. |
| 4,780,856 A | 10/1988 | Becquey |
| 4,823,326 A | 4/1989 | Ward |
| 4,924,390 A | 5/1990 | Parsons et al. |
| 4,953,657 A | 9/1990 | Edington |
| 4,969,129 A | 11/1990 | Currie |
| 4,982,374 A | 1/1991 | Edington et al. |
| 5,260,911 A | 11/1993 | Mason et al. |
| 5,469,062 A | 11/1995 | Meyer, Jr. |
| 5,583,825 A | 12/1996 | Carrazzone et al. |
| 5,677,893 A | 10/1997 | de Hoop et al. |
| 5,715,213 A | 2/1998 | Allen |
| 5,717,655 A | 2/1998 | Beasley |
| 5,719,821 A | 2/1998 | Sallas et al. |
| 5,721,710 A | 2/1998 | Sallas et al. |
| 5,790,473 A | 8/1998 | Allen |
| 5,798,982 A | 8/1998 | He et al. |
| 5,822,269 A | 10/1998 | Allen |
| 5,838,634 A | 11/1998 | Jones et al. |
| 5,852,588 A | 12/1998 | de Hoop et al. |
| 5,878,372 A | 3/1999 | Tabarovsky et al. |
| 5,920,838 A | 7/1999 | Norris et al. |
| 5,924,049 A | 7/1999 | Beasley et al. |
| 5,999,488 A | 12/1999 | Smith |
| 5,999,489 A | 12/1999 | Lazaratos |
| 6,014,342 A | 1/2000 | Lazaratos |
| 6,021,094 A | 2/2000 | Ober et al. |
| 6,028,818 A | 2/2000 | Jeffryes |
| 6,058,073 A | 5/2000 | VerWest |
| 6,125,330 A | 9/2000 | Robertson et al. |
| 6,219,621 B1 | 4/2001 | Hornbostel |
| 6,225,803 B1 | 5/2001 | Chen |
| 6,311,133 B1 | 10/2001 | Lailly et al. |
| 6,317,695 B1 | 11/2001 | Zhou et al. |
| 6,327,537 B1 | 12/2001 | Ikelle |
| 6,374,201 B1 | 4/2002 | Grizon et al. |
| 6,381,543 B1 | 4/2002 | Guerillot et al. |
| 6,388,947 B1 | 5/2002 | Washbourne et al. |
| 6,480,790 B1 | 11/2002 | Calvert et al. |
| 6,522,973 B1 | 2/2003 | Tonellot et al. |
| 6,545,944 B2 | 4/2003 | de Kok |
| 6,549,854 B1 | 4/2003 | Malinverno et al. |
| 6,574,564 B2 | 6/2003 | Lailly et al. |
| 6,593,746 B2 | 7/2003 | Stolarczyk |
| 6,662,147 B1 | 12/2003 | Fournier et al. |
| 6,665,615 B2 | 12/2003 | Van Riel et al. |
| 6,687,619 B2 | 2/2004 | Moerig et al. |
| 6,687,659 B1 | 2/2004 | Shen |
| 6,704,245 B2 | 3/2004 | Becquey |
| 6,714,867 B2 | 3/2004 | Meunier |
| 6,735,527 B1 | 5/2004 | Levin |
| 6,754,590 B1 | 6/2004 | Moldoveanu |
| 6,766,256 B2 | 7/2004 | Jeffryes |
| 6,826,486 B1 | 11/2004 | Malinverno |
| 6,836,448 B2 | 12/2004 | Robertsson et al. |
| 6,842,701 B2 | 1/2005 | Moerig et al. |
| 6,859,734 B2 | 2/2005 | Bednar |
| 6,865,487 B2 | 3/2005 | Charron |
| 6,865,488 B2 | 3/2005 | Moerig et al. |
| 6,876,928 B2 | 4/2005 | Van Riel et al. |
| 6,882,938 B2 | 4/2005 | Vaage et al. |
| 6,882,958 B2 | 4/2005 | Schmidt et al. |
| 6,901,333 B2 | 5/2005 | Van Riel et al. |
| 6,903,999 B2 | 6/2005 | Curtis et al. |
| 6,905,916 B2 | 6/2005 | Bartsch et al. |
| 6,906,981 B2 | 6/2005 | Vauge |
| 6,927,698 B2 | 8/2005 | Stolarczyk |
| 6,944,546 B2 | 9/2005 | Xiao et al. |
| 6,947,843 B2 | 9/2005 | Fisher et al. |
| 6,970,397 B2 | 11/2005 | Castagna et al. |
| 6,977,866 B2 | 12/2005 | Huffman et al. |
| 6,999,880 B2 | 2/2006 | Lee |
| 7,046,581 B2 | 5/2006 | Calvert |
| 7,050,356 B2 | 5/2006 | Jeffryes |
| 7,069,149 B2 | 6/2006 | Goff et al. |
| 7,027,927 B2 | 7/2006 | Routh et al. |
| 7,072,767 B2 | 7/2006 | Routh et al. |
| 7,092,823 B2 | 8/2006 | Lailly et al. |
| 7,110,900 B2 | 9/2006 | Adler et al. |
| 7,184,367 B2 | 2/2007 | Yin |
| 7,230,879 B2 | 6/2007 | Herkenoff et al. |
| 7,271,747 B2 | 9/2007 | Baraniuk et al. |
| 7,330,799 B2 | 2/2008 | Lefebvre et al. |
| 7,337,069 B2 | 2/2008 | Masson et al. |
| 7,373,251 B2 | 5/2008 | Hamman et al. |
| 7,373,252 B2 | 5/2008 | Sherrill et al. |
| 7,376,046 B2 | 5/2008 | Jeffryes |
| 7,376,539 B2 | 5/2008 | Lecomte |
| 7,400,978 B2 | 7/2008 | Langlais et al. |
| 7,436,734 B2 | 10/2008 | Krohn |
| 7,480,206 B2 | 1/2009 | Hill |
| 7,584,056 B2 | 9/2009 | Koren |
| 7,599,798 B2 | 10/2009 | Beasley et al. |
| 7,602,670 B2 | 10/2009 | Jeffryes |
| 7,616,523 B1 | 11/2009 | Tabti et al. |
| 7,620,534 B2 | 11/2009 | Pita et al. |
| 7,620,536 B2 | 11/2009 | Chow |
| 7,646,924 B2 | 1/2010 | Donoho |
| 7,672,194 B2 | 3/2010 | Jeffryes |
| 7,672,824 B2 | 3/2010 | Dutta et al. |
| 7,675,815 B2 | 3/2010 | Saenger et al. |
| 7,679,990 B2 | 3/2010 | Herkenhoff et al. |
| 7,684,281 B2 | 3/2010 | Vaage et al. |
| 7,710,821 B2 | 5/2010 | Robertsson et al. |
| 7,715,985 B2 | 5/2010 | Van Manen et al. |
| 7,715,986 B2 | 5/2010 | Nemeth et al. |
| 7,725,266 B2 | 5/2010 | Sirgue et al. |
| 7,791,980 B2 | 9/2010 | Robertsson et al. |
| 7,835,072 B2 | 11/2010 | Izumi |
| 7,840,625 B2 | 11/2010 | Candes et al. |
| 7,940,601 B2 | 5/2011 | Ghosh |
| 8,121,823 B2 | 2/2012 | Krebs et al. |
| 8,248,886 B2 | 8/2012 | Neelamani et al. |
| 8,428,925 B2 | 4/2013 | Krebs et al. |
| 8,437,998 B2 | 5/2013 | Routh et al. |
| 8,688,381 B2 | 4/2014 | Routh et al. |
| 2002/0099504 A1 | 7/2002 | Cross et al. |
| 2002/0120429 A1 | 8/2002 | Ortoleva |
| 2002/0183980 A1 | 12/2002 | Guillaume |
| 2004/0199330 A1 | 10/2004 | Routh et al. |
| 2004/0225438 A1 | 11/2004 | Okoniewski et al. |
| 2005/0234718 A1* | 10/2005 | Ouimet ............... G06Q 10/04 704/241 |
| 2006/0235666 A1 | 10/2006 | Assa et al. |
| 2007/0036030 A1 | 2/2007 | Baumel et al. |
| 2007/0038691 A1 | 2/2007 | Candes et al. |
| 2007/0274155 A1 | 11/2007 | Ikelle |
| 2008/0175101 A1 | 7/2008 | Saenger et al. |
| 2008/0306692 A1 | 12/2008 | Singer et al. |
| 2009/0006054 A1 | 1/2009 | Song |
| 2009/0067041 A1 | 3/2009 | Krauklis et al. |
| 2009/0070042 A1 | 3/2009 | Birchwood et al. |
| 2009/0083006 A1 | 3/2009 | Mackie |
| 2009/0164186 A1 | 6/2009 | Haase et al. |
| 2009/0164756 A1 | 6/2009 | Dokken et al. |
| 2009/0187391 A1 | 7/2009 | Wendt et al. |
| 2009/0248308 A1 | 10/2009 | Luling |
| 2009/0254320 A1 | 10/2009 | Lovatini et al. |
| 2009/0259406 A1 | 10/2009 | Khadhraoui et al. |
| 2010/0008184 A1 | 1/2010 | Hegna et al. |
| 2010/0018718 A1 | 1/2010 | Krebs et al. |
| 2010/0039894 A1 | 2/2010 | Abma et al. |
| 2010/0054082 A1 | 3/2010 | McGarry et al. |

(56) References Cited

U.S. PATENT DOCUMENTS

| | | |
|---|---|---|
| 2010/0088035 A1 | 4/2010 | Etgen et al. |
| 2010/0103772 A1 | 4/2010 | Eick et al. |
| 2010/0118651 A1 | 5/2010 | Liu et al. |
| 2010/0142316 A1 | 6/2010 | Keers et al. |
| 2010/0161233 A1 | 6/2010 | Saenger et al. |
| 2010/0161234 A1 | 6/2010 | Saenger et al. |
| 2010/0185422 A1 | 7/2010 | Hoversten |
| 2010/0208554 A1 | 8/2010 | Chiu et al. |
| 2010/0212902 A1 | 8/2010 | Baumstein et al. |
| 2010/0265797 A1 | 10/2010 | Robertsson et al. |
| 2010/0270026 A1 | 10/2010 | Lazaratos et al. |
| 2010/0286919 A1 | 11/2010 | Lee et al. |
| 2010/0299070 A1 | 11/2010 | Abma |
| 2011/0000678 A1 | 1/2011 | Krebs et al. |
| 2011/0040926 A1 | 2/2011 | Donderici et al. |
| 2011/0051553 A1 | 3/2011 | Scott et al. |
| 2011/0090760 A1 | 4/2011 | Rickett et al. |
| 2011/0131020 A1 | 6/2011 | Meng |
| 2011/0134722 A1 | 6/2011 | Virgilio et al. |
| 2011/0182141 A1 | 7/2011 | Zhamikov et al. |
| 2011/0182144 A1 | 7/2011 | Gray |
| 2011/0191032 A1 | 8/2011 | Moore |
| 2011/0194379 A1* | 8/2011 | Lee .................. G01V 1/368 367/73 |
| 2011/0222370 A1 | 9/2011 | Downton et al. |
| 2011/0227577 A1 | 9/2011 | Zhang et al. |
| 2011/0235464 A1 | 9/2011 | Brittan et al. |
| 2011/0238390 A1 | 9/2011 | Krebs et al. |
| 2011/0246140 A1 | 10/2011 | Abubakar et al. |
| 2011/0267921 A1 | 11/2011 | Mortel et al. |
| 2011/0267923 A1* | 11/2011 | Shin .................. G01V 1/30 367/49 |
| 2011/0276320 A1 | 11/2011 | Krebs et al. |
| 2011/0288831 A1 | 11/2011 | Tan et al. |
| 2011/0299361 A1 | 12/2011 | Shin |
| 2011/0320180 A1 | 12/2011 | Al-Saleh |
| 2012/0010862 A1 | 1/2012 | Costen |
| 2012/0014215 A1 | 1/2012 | Saenger et al. |
| 2012/0014216 A1 | 1/2012 | Saenger et al. |
| 2012/0051176 A1 | 3/2012 | Liu |
| 2012/0073824 A1 | 3/2012 | Routh |
| 2012/0073825 A1 | 3/2012 | Routh |
| 2012/0082344 A1 | 4/2012 | Donoho |
| 2012/0143506 A1 | 6/2012 | Routh et al. |
| 2012/0215506 A1 | 8/2012 | Rickett et al. |
| 2012/0275264 A1 | 11/2012 | Kostov et al. |
| 2012/0275267 A1 | 11/2012 | Neelamani et al. |
| 2012/0290214 A1 | 11/2012 | Huo et al. |
| 2012/0314538 A1 | 12/2012 | Washbourne et al. |
| 2012/0316790 A1 | 12/2012 | Washbourne et al. |
| 2012/0316844 A1 | 12/2012 | Shah et al. |
| 2013/0081752 A1 | 4/2013 | Kurimura et al. |
| 2013/0185032 A1* | 7/2013 | Archer ............... G06F 17/5009 703/2 |
| 2013/0238246 A1 | 9/2013 | Krebs et al. |
| 2013/0311149 A1 | 11/2013 | Tang et al. |
| 2013/0311151 A1 | 11/2013 | Plessix |
| 2014/0350861 A1 | 11/2014 | Wang et al. |
| 2014/0358504 A1 | 12/2014 | Baumstein et al. |
| 2014/0372043 A1 | 12/2014 | Hu et al. |
| 2015/0012221 A1 | 1/2015 | Bansal et al. |
| 2015/0057938 A1 | 2/2015 | Krohn et al. |

FOREIGN PATENT DOCUMENTS

| | | |
|---|---|---|
| EP | 1 746 443 | 1/2007 |
| GB | 2 390 712 | 1/2004 |
| GB | 2 391 665 | 2/2004 |
| WO | WO 2006/037815 | 4/2006 |
| WO | WO 2007/046711 | 4/2007 |
| WO | WO 2008/042081 | 4/2008 |
| WO | WO 2008/123920 | 10/2008 |
| WO | WO 2009/067041 | 5/2009 |
| WO | WO 2009/117174 | 9/2009 |
| WO | WO 2010/085822 | 7/2010 |
| WO | WO 2011/040926 | 4/2011 |
| WO | WO 2011/091216 | 7/2011 |
| WO | WO 2011/093945 | 8/2011 |
| WO | WO 2012/024025 | 2/2012 |
| WO | WO 2012/041834 | 4/2012 |
| WO | WO 2012/083234 | 6/2012 |
| WO | WO 2012/134621 | 10/2012 |
| WO | WO 2012/170201 | 12/2012 |
| WO | WO 2013/081752 | 6/2013 |

OTHER PUBLICATIONS

Flectcher et al., "Inversion After Depth Imaging" (Nov. 4-9, 2012), 2012 SEG Annual Meeting, pp. 1-5 [retrieved from https://www.onepetro.org/conference-paper/SEG-2012-0427].*

Abt, D.L. et al. (2010), "North American lithospheric discontinuity structured imaged by Ps and Sp receiver functions", *J. Geophys. Res.*, 24 pgs.

Akerberg, P., et al. (2008), "Simultaneous source separation by sparse radon transform," 78th SEG Annual International Meeting, *Expanded Abstracts*, pp. 2801-2805.

Aki, K. et al. (1980), "Quantitative Seismology: Theory and Methods vol. I—Chapter 7—Surface Waves in a Vertically Heterogenous Medium," W.H. Freeman and Co., pp. 259-318.

Aki, K. et al. (1980), "Quantitative Seismology: Theory and Methods vol. I," W.H. Freeman and Co., p. 173.

Aki et al. (1980), "Quantitative Seismology, Theory and Methods," Chapter 5.20, W.H. Freeman & Co., pp. 133-155.

Amundsen, L. (2001), "Elimination of free-surface related multiples without need of the source wavelet," *Geophysics* 60(1), pp. 327-341.

Anderson, J.E. et al. (2008), "Sources Near the Free-Surface Boundary: Pitfalls for Elastic Finite-Difference Seismic Simulation and Multi-Grid Waveform Inversion," $70^{th}$ EAGE Conf. & Exh., 4 pgs.

Barr, F.J. et al. (1989), "Attenuation of Water-Column Reverberations Using Pressure and Velocity Detectors in a Water-Bottom Cable," $59^{th}$ Annual SEG meeting, *Expanded Abstracts*, pp. 653-656.

Baumstein, A. et al. (2009), "Scaling of the Objective Function Gradient for Full Wavefield Inversion," SEG Houston 2009 Int'l. Expo and Annual Meeting, pp. 224-2247.

Beasley, C. (2008), "A new look at marine simultaneous sources," *The Leading Edge* 27(7), pp. 914-917.

Beasley, C. (2012), "A 3D simultaneous source field test processed using alternating projections: a new active separation method," *Geophsyical Prospecting* 60, pp. 591-601.

Beaty, K.S. et al. (2003), "Repeatability of multimode Rayleigh-wave dispersion studies," *Geophysics* 68(3), pp. 782-790.

Beaty, K.S. et al. (2002), "Simulated annealing inversion of multimode Rayleigh wave dispersion waves for geological structure," *Geophys. J. Int.* 151, pp. 622-631.

Becquey, M. et al. (2002), "Pseudo-Random Coded Simultaneous Vibroseismics," SEG Int'l. Exposition and 72th Annl. Mtg., 4 pgs.

Ben-Hadj-Ali, H. et al. (2009), "Three-dimensional frequency-domain full waveform inversion with phase encoding," *SEG Expanded Abstracts*, pp. 2288-2292.

Ben-Hadj-Ali, H. et al. (2011), "An efficient frequency-domain full waveform inversion method using simultaneous encoded sources," *Geophysics* 76(4), pp. R109-R124.

Benitez, D. et al. (2001), "The use of the Hilbert transform in ECG signal analysis," *Computers in Biology and Medicine* 31, pp. 399-406.

Berenger, J-P. (1994), "A Perfectly Matched Layer for the Absorption of Electromagnetic Waves," *J. of Computational Physics* 114, pp. 185-200.

Berkhout, A.J. (1987), "Applied Seismic Wave Theory," Elsevier Science Publishers, p. 142.

Berkhout, A.J. (1992), "Areal shot record technology," *Journal of Seismic Exploration* 1, pp. 251-264.

Berkhout, A.J. (2008), "Changing the mindset in seismic data acquisition," *The Leading Edge* 27(7), pp. 924-938.

(56) References Cited

OTHER PUBLICATIONS

Beylkin, G. (1985), "Imaging of discontinuities in the inverse scattring problem by inversion of a causal generalized Radon transform," *J. Math. Phys.* 26, pp. 99-108.
Biondi, B. (1992), "Velocity estimation by beam stack," *Geophysics* 57(8), pp. 1034-1047.
Bonomi, E. et al. (2006), "Wavefield Migration plus Monte Carlo Imaging of 3D Prestack Seismic Data," *Geophysical Prospecting* 54, pp. 505-514.
Boonyasiriwat, C. et al. (2010), 3D Multisource Full-Waveform using Dynamic Random Phase Encoding, SEG Denver 2010 Annual Meeting, pp. 1044-1049.
Boonyasiriwat, C. et al. (2010), 3D Multisource Full-Waveform using Dynamic Random Phase Encoding, SEG Denver 2010 Annual Meeting, pp. 3120-3124.
Bunks, C., et al. (1995), "Multiscale seismic waveform inversion," *Geophysics* 60, pp. 1457-1473.
Burstedde, G. et al. (2009), "Algorithmic strategies for full wavefon 'inversion: 1D experiments," *Geophysics* 74(6), pp. WCC17-WCC46.
Chavent, G. et al. (1999), "An optimal true-amplitude least-squares prestack depth-migration operator," *Geophysics* 64(2), pp. 508-515.
Choi, Y. et al. (2011), "Application of encoded multisource waveform inversion to marine-streamer acquisition based on the global correlation," $73^{rd}$ EAGE Conference, *Abstract*, pp. F026.
Choi, Y et al. (2012), "Application of multi-source waveform inversion to marine stream data using the global correlation norm," *Geophysical Prospecting* 60, pp. 748-758.
Clapp, R.G. (2009), "Reverse time migration with random boundaries," SEG International Exposition and Meeting, *Expanded Abstracts*, pp. 2809-2813.
Dai, W. et al. (2010), "3D Multi-source Least-squares Reverse Time Migration," SEG Denver 2010 Annual Meeting, pp. 3120-3124.
Delprat-Jannuad, F. et al. (2005), "A fundamental limitation for the reconstruction of impedance profiles from seismic data," *Geophysics* 70(1), pp. R1-R14.
Dickens, T.A. et al. (2011), RTM angle gathers using Poynting vectors, *SEG Expanded Abstracts* 30, pp. 3109-3113.
Donerici, B. et al. (1005), "Improved FDTD Subgridding Algorithms Via Digital Filtering and Domain Overriding," *IEEE Transactions on Antennas and Propagation* 53(9), pp. 2938-2951.
Downey, N. et al. (2011), "Random-Beam Full-Wavefield Inversion," 2011 San Antonio Annual Meeting, pp. 2423-2427.
Dunkin, J.W. et al. (1973), "Effect of Normal Moveout on a Seismic Pluse," *Geophysics* 38(4), pp. 635-642.
Dziewonski A. et al. (1981), "Preliminary Reference Earth Model", *Phys. Earth Planet. Int.* 25(4), pp. 297-356.
Ernst, F.E. et al. (2000), "Tomography of dispersive media," *J. Acoust. Soc. Am* 108(1), pp. 105- 116.
Ernst, F.E. et al. (2002), "Removal of scattered guided waves from seismic data," *Geophysics* 67(4), pp. 1240-1248.
Esmersoy, C. (1990), "Inversion of P and SV waves from multicomponent offset vertical seismic profiles", *Geophysics* 55(1), pp. 39-50.
Etgen, J.T. et al. (2007), "Computational methods for large-scale 3D acoustic finite-difference modeling: A tutorial," *Geophysics* 72(5), pp. SM223-SM230.
Fallat, M.R. et al. (1999), "Geoacoustic inversion via local, global, and hybrid algorithms," *Journal of the Acoustical Society of America* 105, pp. 3219-3230.
Fichtner, A. et al. (2006), "The adjoint method in seismology I. Theory," *Physics of the Earth and Planetary Interiors* 157, pp. 86-104.
Forbriger, T. (2003), "Inversion of shallow-seismic wavefields: I. Wavefield transfoimation," *Geophys. J. Int.* 153, pp. 719-734.
U.S. Appl. No. 14/286,107, filed May 23, 2014, Hu et al.
U.S. Appl. No. 14/329,431, filed Jul. 11, 2014, Krohn et al.
Gao, H. et al. (2008), "Implementation of perfectly matched layers in an arbitrary geometrical boundary for leastic wave modeling," *Geophysics J. Int.* 174, pp. 1029-1036.

Gibson, B. et al. (1984), "Predictive deconvolution and the zero-phase source," *Geophysics* 49(4), pp. 379-397.
Godfrey, R. J. et al. (1998), "Imaging the Foiaven Ghost," *SEG Expanded Abstracts*, 4 pgs.
Griewank, a. (1992), "Achieving logarithmic growth of temporal and spatial complexity in reverse automatic differentiation," 1 *Optimization Methods and Software*, pp. 35-54.
Griewank, A. (2000), Evaluating Derivatives: Principles and Techniques of Algorithmic Differentiation, Society for Industrial and Applied Mathematics, 49 pgs.
Griewank, A. et al. (2000), "Algorithm 799: An implementation of checkpointing for the reverse or adjoint mode of computational differentiation," 26 *ACM Transactions on Mathematical Software*, pp. 19-45.
Griewank, A. et al. (1996), "Algorithm 755: A package for the automatic differentiation of algorithms written in C/C++," *ACM Transactions on Mathematical Software* 22(2), pp. 131-167.
Haber, E. et al. (2010), "An effective method for parameter estimation with PDE constraints with multiple right hand sides," Preprint—UBC http://www.math.ubc.ca/~haber/pubs/PdeOptStochV5.pdf.
Hampson, D.P. et al. (2005), "Simultaneous inversion of pre-stack seismic data," SEG $75^{th}$ Annual Int'l. Meeting, *Expanded Abstracts*, pp. 1633-1637.
Heinkenschloss, M. (2008), :"Numerical Solution of Implicity Constrained Optimization Problems," CAAM Technical Report TR08-05, 25 pgs.
Helbig, K. (1994), "Foundations of Anisotropy for Exploration Seismics," Chapter 5, pp. 185-194.
Herrmann, F.J. (2010), "Randomized dimensionality reduction for full-waveform inversion," *EAGE abstract* G001, EAGE Barcelona meeting, 5 pgs.
Holschneider, J. et al. (2005), "Characterization of dispersive surface waves using continuous wavelet transforms," *Geophys. J. Int.* 163, pp. 463-478.
Hu, L.Z. et al. (1987), "Wave-field transformations of vertical seismic profiles," *Geophysics* 52, pp. 307-321.
Huang, Y. et al. (2012), "Multisource least-squares migration of marine streamer and land data with frequency-division encoding," *Geophysical Prospecting* 60, pp. 663-680.
Igel, H. et al. (1996), "Waveform inversion of marine reflection seismograms for P impedance and Poisson's ratio," *Geophys. J. Int.* 124, pp. 363-371.
Ikelle, L.T. (2007), "Coding and decoding: Seismic data modeling, acquisition, and processing," 77th Annual Int'l. Meeting, SEG Expanded Abstracts, pp. 66-70.
Jackson, D.R. et al. (1991), "Phase conjugation in underwater acoustics," *J. Acoust. Soc. Am.* 89(1), pp. 171-181.
Jing, X. et al. (2000), "Encoding multiple shot gathers in prestack migration," *SEG International Exposition and $70^{th}$ Annual Meeting Expanded Abstracts*, pp. 786-789.
Kennett, B.L.N. (1991), "The removal of free surface interactions from three-component seismograms", *Geophys. J. Int.* 104, pp. 153-163.
Kennett, B.L.N. et al. (1988), "Subspace methods for large inverse problems with multiple parameter classes," *Geophysical J.* 94, pp. 237-247.
Krebs, J.R. (2008), "Fast Full-wavefield seismic inversion using encoded sources," *Geophysics* 74(6), pp. WCC177-WCC188.
Krohn, C.E. (1984), "Geophone ground coupling," *Geophysics* 49(6), pp. 722-731.
Kroode, F.T. et al. (2009), "Wave Equation Based Model Building and Imaging in Complex Settings," OTC 20215, 2009 Offshore Technology Conf., Houston, TX, May 4-7, 2009, 8 pgs.
Kulesh, M. et al. (2008), "Modeling of Wave Dispersion Using Continuous Wavelet Transforms II: Wavelet-based Frequency-velocity Analysis," *Pure Applied Geophysics* 165, pp. 255-270.
Lancaster, S. et al. (2000), "Fast-track 'colored' inversion," $70^{th}$ SEG Ann. Meeting, *Expanded Abstracts*, pp. 1572-1575.
Lazaratos, S. et al. (2009), "Inversion of Pre-migration Spectral Shaping," 2009 SEG Houston Int'l. Expo. & Ann Meeting, *Expanded Abstracts*, pp. 2383-2387.

(56) References Cited

OTHER PUBLICATIONS

Lazaratos, S. (2006), "Spectral Shaping Inversion for Elastic and Rock Property Estimation," *Research Disclosure,* Issue 511, pp. 1453-1459.

Lazaratos, S. et al. (2011), "Improving the convergence rate of full wavefield inversion using spectral shaping," *SEG Expanded Abstracts* 30, pp. 2428-2432.

Lecomte, I. (2008), "Resolution and illumination analyses in PSDM: A ray-based approach," The Leading Edge, pp. 650-663.

Lee, S. et al. (2010), "Subsurface parameter estimation in full wavefield inversion and reverse time migration," SEG Denver 2010 Annual Meeting, pp. 1065-1069.

Levanon, N. (1988), "Radar Principles," Chpt. 1, John Whiley & Sons, New York, pp. 1-18.

Liao, Q. et al. (1995), "2.5D full-wavefield viscoacoustic inversion," *Geophysical Prospecting* 43, pp. 1043-1059.

Liu, F. et al. (2007), "Reverse-time migration using one-way wavefield imaging condition," *SEG Expanded Abstracts* 26, pp. 2170-2174.

Liu, F. et al. (2011), "An effective imaging condition for reverse-time migration using wavefield decomposition," *Geophysics* 76, pp. S29-S39.

Maharramov, M. et al. (2007), "Localized image-difference wave-equation tomography," SEG Annual Meeting, *Expanded Abstracts,* pp. 3009-3013.

Malmedy, V. et al. (2009), "Approximating Hessians in unconstrained optimization arising from discretized problems," *Computational Optimization and Applications,* pp. 1-16.

Marcinkovich, C. et al. (2003), "On the implementation of perfectly matched layers in a three-dimensional fourth-order velocity-stress finite difference scheme," *J. of Geophysical Research* 108(B5), 2276.

Martin, G.S. et al. (2006), "Marmousi2: An elastic upgrade for Marmousi," *The Leading Edge,* pp. 156-166.

Meier, M.A. et al. (2009), "Converted wave resolution," Geophysics, 74(2):doi:10.1190/1.3074303, pp. Q1-Q16.

Moghaddam, P.P. et al. (2010), "Randomized full-waveform inversion: a dimenstionality-reduction approach," $80^{th}$ SEG Ann. Meeting, *Expanded Abstracts,* pp. 977-982.

Mora, P. (1987), "Nonlinear two-dimensional elastic inversion of multi-offset seismic data," *Geophysics* 52, pp. 1211-1228.

Mora, P. (1987), "Elastic Wavefield Inversion," PhD Thesis, Stanford University, pp. 22-25.

Mora, P. (1989), "Inversion = migration + tomography," *Geophysics* 64, pp. 888-901.

Nazarian, S. et al. (1983), "Use of spectral analysis of surface waves method for determination of moduli and thickness of pavement systems," *Transport Res. Record* 930, pp. 38-45.

Neelamani, R., (2008), "Simultaneous sourcing without compromise," 70th Annual Int'l. Conf. and Exh., Eage, 5 pgs.

Neelamani, R. (2009), "Efficient seismic forward modeling using simultaneous sources and sparsity," *SEG Expanded Abstracts,* pp. 2107-2111.

Nocedal, J. et al. (2006), *"Numerical Optimization, Chapt. 7—Large-Scale Unconstrained Optimization,"* Springer, New York, $2^{nd}$ Edition, pp. 165-176.

Nocedal, J. et al. (2000), "Numerical Optimization-Calculating Derivatives," Chapter 8, Springer Verlag, pp. 194-199.

Ostmo, S. et al. (2002), "Finite-difference iterative migration by linearized waveform inversion in the frequency domain," SEG Int'l. Expo. & $72^{nd}$ Ann. Meeting, 4 pgs.

Park, C.B. et al. (1999), "Multichannel analysis of surface waves," *Geophysics* 64(3), pp. 800-808.

Park, C.B. et al. (2007), "Multichannel analysis of surface waves (MASW)—active and passive methods," *The Leading Edge,* pp. 60-64.

Pica, A. et al. (2005), "3D Surface-Related Multiple Modeling, Principles and Results," 2005 SEG Ann. Meeting, *SEG Expanded Abstracts* 24, pp. 2080-2083.

Plessix, R.E. et al. (2004), "Frequency-domain finite-difference amplitude preserving migration," *Geophys. J. Int.* 157, pp. 975-987.

Porter, R.P. (1989), "Generalized holography with application to inverse scattering and inverse source problems," In E. Wolf, editor. Prowess in Optics XXVII, Elsevier, pp. 317-397.

Pratt, R.G. et al. (1998), "Gauss-Newton and full Newton methods in frequency-space seismic waveform inversion," *Geophys. J Int.* 133, pp. 341-362.

Pratt, R.G. (1999), "Seismic waveform inversion in the frequency domain, Part 1: Theory and verification in a physical scale model," *Geophysics* 64, pp. 888-901.

Rawlinson, N. et al. (2008), "A dynamic objective function technique for generating multiple solution models in seismic tomography," *Geophys. J Int.* 178, pp. 295-308.

Rayleigh, J.W.S. (1899), "On the transmission of light through an atmosphere containing small particles in suspension, and on the origin of the blue of the sky," Phil. Mag. 47, pp. 375-384.

Romero, L.A. et al. (2000), Phase encoding of shot records in prestack migration, *Geophysics* 65, pp. 426-436.

Ronen S. et al. (2005), "Imaging Downgoing waves from Ocean Bottom Stations," *SEG Expanded Abstracts,* pp. 963-967.

Routh, P. et al. (2011), "Encoded Simultaneous Source Full-Wavefield Inversion for Spectrally-Shaped Marine Streamer Data," SEG San Antonio 2011 Ann. Meeting, pp. 2433-2438.

Ryden, N. et al. (2006), "Fast simulated annealing inversion of surface waves on pavement using phase-velocity spectra," *Geophysics* 71(4), pp. R49-R58.

Sambridge, M.S. et al. (1991), "An Alternative Strategy for Non-Linear Inversion of Seismic Waveforms," *Geophysical Prospecting* 39, pp. 723-736.

Schoenberg, M. et al. (1989), "A calculus for finely layered anisotropic media," *Geophysics* 54, pp. 581-589.

Schuster, G.T. et al. (2010), "Theory of Multisource Crosstalk Reduction by Phase-Encoded Statics," SEG Denver 2010 Ann. Meeting, pp. 3110-3114.

Sears, T.J. et al. (2008), "Elastic full waveform inversion of multi-component OBC seismic data," *Geophysical Prospecting* 56, pp. 843-862.

Sheen, D-H. et al. (2006), "Time domain Gauss-Newton seismic waveform inversion in elastic media," Geophysics J. Int. 167, pp. 1373-1384.

Shen, P. et al. (2003), "Differential semblance velocity analysis by wave-equation migration," $73^{rd}$ Ann. Meeting of Society of Exploration Geophysicists, 4 pgs.

Sheng, J. et al. (2006), "Early arrival waveform tomography on near-surface refraction data," *Geophysics* 71, pp. U47-U57.

Sheriff, R.E.et al. (1982), *"Exploration Seismology",* pp. 134-135.

Shih, R-C. et al. (1996), "Iterative pre-stack depth migration with velocity analysis," *Terrestrial, Atmospheric & Oceanic Sciences* 7(2), pp. 149-158.

Shin, C. et al. (2001), "Waveform inversion using a logarithmic wavefield," *Geophysics* 49, pp. 592-606.

Simard, P.Y. et al. (1990), "Vector Field Restoration by the Method of Convex Projections," *Computer Vision, Graphics and Image Processing* 52, pp. 360-385.

Sirgue, L. (2004), "Efficient waveform inversion and imaging: A strategy for selecting temporal frequencies," *Geophysics* 69, pp. 231-248.

Soubaras, R. et al. (2007), "Velocity model building by semblance maximization of modulated-shot gathers," *Geophysics* 72(5), pp. U67-U73.

Spitz, S. (2008), "Simultaneous source separation: a prediction-subtraction approach," 78th Annual Int'l. Meeting, *SEG Expanded Abstracts,* pp. 2811-2815.

Stefani, J. (2007), "Acquisition using simultaneous sources," 69th Annual Conf. and Exh., *EAGE Extended Abstracts,* 5 pgs.

Symes, W.W. (2007), "Reverse time migration with optimal checkpointing," *Geophysics* 72(5), pp. P.SM213-SM221.

Symes, W.W. (2009), "Interface error analysis for numerical wave propagation," *Compu. Geosci.* 13, pp. 363-371.

Tang, Y. (2008), "Wave-equation Hessian by phase encoding," *SEG Expanded Abstracts* 27, pp. 2201-205.

(56) References Cited

OTHER PUBLICATIONS

Tang, Y. (2009), "Target-oriented wave-equation least-squares migration/inversion with phase-encoded Hessian," *Geophysics* 74, pp. WCA95-WCA107.
Tang, Y. et al. (2010), "Preconditioning full waveform inversion with phase-encoded Hessian," *SEG Expanded Abstracts* 29, pp. 1034-1037.
Tarantola, A. (1986), "A strategy for nonlinear elastic inversion of seismic reflection data," *Geophysics* 51(10), pp. 1893-1903.
Tarantola, A. (1988), "Theoretical background for the inversion of seismic waveforms, including elasticity and attenuation," *Pure and Applied Geophysics* 128, pp. 365-399.
Tarantola, A. (2005), "Inverse Problem Theory and Methods for Model Parameter Estimation," *SIAM*, pp. 79.
Tarantola, A. (1984), "Inversion of seismic reflection data in the acoustic approximation," *Geophysics* 49, pp. 1259-1266.
Trantham, E.C. (1994), "Controlled-phase acquisition and processing," *SEG Expanded Abstracts* 13, pp. 890-894.
Tsvankin, I. (2001), "Seismic Signatures and Analysis of Reflection Data in Anisotropic Media," *Elsevier Science*, p. 8.
Valenciano, A.A. (2008), "Imaging by Wave-Equation Inversion," A Dissertation, Stanford University, 138 pgs.
van Groenestijn, G.J.A. et al. (2009), "Estimating primaries by sparse inversion and application to near-offset reconstruction," *Geophyhsics* 74(3), pp. A23-A28.
van Manen, D.J. (2005), "Making wave by time reversal," SEG International Exposition and 75$^{th}$ Annual Meeting, Expanded Abstracts, pp. 1763-1766.
Verschuur, D.J. (2009), Target-oriented, least-squares imaging of blended data, 79th Annual Int'l. Meeting, *SEG Expanded Abstracts*, pp. 2889-2893.
Verschuur, D.J. et al. (1992), "Adaptive surface-related multiple elimination," *Geophysics* 57(9), pp. 1166-1177.
Verschuur, D.J. (1989), "Wavelet Estimation by Prestack Multiple Elimination," *SEG Expanded Abstracts* 8, pp. 1129-1132.
Versteeg, R. (1994), "The Marmousi experience: Velocity model determination on a synthetic complex data set," *The Leading Edge*, pp. 927-936.
Vigh, D. et al. (2008), "3D prestack plane-wave, full-waveform inversion," *Geophysics* 73(5), pp. VE135-VE144.
Wang, Y. (2007), "Multiple prediction through inversion: Theoretical advancements and real data application," *Geophysics* 72(2), pp. V33-V39.
Wang, K. et al. (2009), "Simultaneous full-waveform inversion for source wavelet and earth model," SEG Int'l. Expo. & Ann. Meeting, Expanded Abstracts, pp. 2537-2541.
Weglein, A.B. (2003), "Inverse scattering series and seismic exploration," *Inverse Problems* 19, pp. R27-R83.
Wong, M. et al. (2010), "Joint least-squares inversion of up- and down-going signal for ocean bottom data sets," *SEG Expanded Abstracts* 29, pp. 2752-2756.
Wu R-S. et al. (2006), "Directional illumination analysis using beamlet decomposition and propagation," *Geophysics* 71(4), pp. S147- S159.
Xia, J. et al. (2004), "Utilization of high-frequency Rayleigh waves in near-surface geophysics," *The Leading Edge*, pp. 753-759.
Xie, X. et al. (2002), "Extracting angle domain information from migrated wavefield," *SEG Expanded Abstracts* 21, pp. 1360-1363.
Xie, X.-B. et al. (2006), "Wave-equation-based seismic illumination analysis," *Geophysics* 71(5), pp. S169-S177.
Yang, K. et al. (2000), "Quasi-Orthogonal Sequences for Code-Division Multiple-Access Systems," *IEEE Transactions on Information Theory* 46(3), pp. 982-993.
Yoon, K. et al. (2004), "Challenges in reverse-time migration," *SEG Expanded Abstracts* 23, pp. 1057-1060.
Young, J. et al. (2011), "An application of random projection to parameter estimation in partial differential equations," SIAM, 20 pgs.
Zhang, Y. (2005), "Delayed-shot 3D depth migration," *Geophysics* 70, pp. E21-E28.
Ziolkowski, A. (1991), "Why don't we measure seismic signatures?," *Geophysics* 56(2), pp. 190-201.

\* cited by examiner

ACCELERATING FULL WAVEFIELD INVERSION WITH NONSTATIONARY POINT-SPREAD FUNCTIONS

CROSS-REFERENCE TO RELATED APPLICATION

This application claims the benefit of U.S. Provisional Patent Application 61/874,574, filed Sep. 6, 2013, entitled Accelerating Full Wavefield Inversion with Nonstationary Point Spread Functions, the entirety of which is incorporated by reference herein.

FIELD OF THE INVENTION

This disclosure relates generally to the field of geophysical prospecting and, more particularly, the seismic data processing. Specifically, the invention is a method for accelerating full wavefield inversion of seismic data to infer a subsurface model of velocity or other physical property.

BACKGROUND OF THE INVENTION

Full wavefield inversion (FWI) is a nonlinear inversion technique that recovers the earth model by minimizing the mismatch between the simulated and the observed seismic wavefields. Due to its huge computational cost, current implementation of FWI often utilizes local optimization techniques to optimize the model parameters. A widely used local optimization technique is the gradient-based first-order approach, such as steepest descent and nonlinear conjugate gradient (Tarantola, 1984). The gradient-only first-order approach is relatively efficient, because it requires computing only the gradient of the objective function, a vector containing the first-order partial derivatives of the objective function with respect to the model parameters, but its convergence is usually slow.

The convergence can be significantly improved by using the second-order optimization technique, which uses not only the gradient information, but also the curvature information of the objective function. The main difference between the first- and the second-order approach is that the second-order approach preconditions the gradient with the inverse of the Hessian, such as Gauss-Newton/Newton method (Pratt, 1998), or the inverse of a projected Hessian, such as the subspace approach (Kennett, 1988). The Hessian is a matrix containing second-order partial derivatives of the objective function with respect to the model parameters. The second-order approach is attractive not only because of its fast convergence rate, but also because of its capability to properly scale the gradient for different parameters and provide meaningful updates for parameters with different units in the context of multi-parameter inversion. The parameter scaling using the Hessian can be crucial in multi-parameter inversion, especially when one wants to simultaneously invert multiple parameters. Computing the inverse of the Hessian or the Hessian itself or even the product of the Hessian and a vector, however, is very expensive, and it is the main obstacle that prevents the second-order approach from being widely used in practice. In the present invention, the full Hessian is replaced with a banded matrix, assuming that the Hessian is sparse and the most significant entries are around its diagonals and subdiagonals. By doing so, the action of the Hessian on a vector, i.e., Hessian-vector product, becomes a sparse matrix multiplying a vector, and it can be very efficiently calculated. Computing the action of the Hessian-vector product is the main building block in both the Gauss-Newton/Newton approach and the subspace approach. Therefore, reducing the computational cost of the action of the Hessian-vector product is essential to reducing the cost of the second-order approach.

Review of the Second-Order Approach

The Gauss-Newton/Newton approach requires solving the following linear system at every nonlinear iteration:

$$Hg_{new}=g, \qquad (1)$$

where H is the Hessian matrix, g is the gradient, and $g_{new}$ is the preconditioned new gradient. The above equation is usually solved iteratively using the linear conjugate gradient algorithm, where the Hessian-vector product needs to be computed at each linear iteration. Equation (1) may be inverted to get the preconditioned gradient. This may be done iteratively, and a typical algorithm for doing so may be found on page 111 of *Numerical Optimization*, by Nocedal and Wright (2000), which may be summarized as follows:

---

Given $g_{new}^0$
Set $r_0 \leftarrow Hg_{new}^0 - g$, $p_0 \leftarrow r_0$, $k \leftarrow 0$
while $r_k^T r_k$ is bigger than tolerance $$\gamma_k \leftarrow \frac{r_k^T r_k}{p_k^T H p_k};$$

$$g_{new}^{k+1} \leftarrow g_{new}^k + \gamma_k p_k;$$
$$r_{k+1} \leftarrow r_k + \gamma_k H p_k;$$

$$\lambda_{k+1} \leftarrow \frac{r_{k+1}^T r_{k+1}}{r_k^T r_k};$$

$$p_{k+1} \leftarrow -r_{k+1} + \lambda_{k+1} p_k;$$
$$k \leftarrow k + 1$$
end while.

---

Instead of solving equation (1), which is huge (for example, if the model contains N parameters to be inverted for, and each parameter has M samples, the Hessian then contains $N^2 \times M^2$ samples), the subspace approach projects the Hessian into a lower-dimensional space, hence a much smaller linear system to solve. For the case of inverting two parameters, it results in a 2×2 system as shown in equation (2). Because of the projection, the subspace approach uses less second order information. In the subspace approach, a projected Hessian needs to be inverted at every nonlinear iteration. For simplicity, taking inverting two parameters as an example, the following two-by-two system may be solved at every nonlinear iteration (generalization to inversion of more than two parameters is straightforward).

$$\begin{pmatrix} s_1^T H s_1 & s_1^T H s_2 \\ s_2^T H s_1 & s_2^T H s_2 \end{pmatrix} \begin{pmatrix} \alpha \\ \beta \end{pmatrix} = -\begin{pmatrix} g^T s_1 \\ g^T s_2 \end{pmatrix}, \qquad (2)$$

where α and β are constants used to scale different gradient components as discussed later; and g is the gradient containing components of both parameters $$g = \begin{pmatrix} g_1 \\ g_2 \end{pmatrix},$$

where $g_1$ and $g_2$ are the gradients for the first and the second parameter. Vectors $s_1$ and $s_2$ are the basis vectors defined as follows:

$$s_1 = \begin{pmatrix} -g_1 \\ 0 \end{pmatrix}, s_2 = \begin{pmatrix} 0 \\ -g_2 \end{pmatrix}, \quad (3)$$

where 0 denotes a vector containing zeros. Once the two-by-two system (equation 3) is solved, we get the preconditioned new gradient as follows:

$$g_{new} = -\alpha s_1 - \alpha s_2. \quad (4)$$

The construction of the two-by-two system requires computing two Hessian-vector products, i.e., $Hs_1$ and $Hs_2$. In general, if the subspace approach is used to invert N parameters, a Hessian-vector product needs to be evaluated N times at every nonlinear iteration.

Therefore, the cost of either Gauss-Newton/Newton or the subspace approach is directly related to the cost of computing the Hessian-vector product. The Hessian-vector product is usually computed using linearized modeling (Born modeling) followed by an adjoint modeling or using the finite difference approximation, both of which requires calling the simulator to do wavefield forward/adjoint modelings. The computational cost is typically two FWI gradient evaluations. An example of such a method is PCT patent application publication WO 2013/081752, by Lee and Baumstein, which approximates the exact Hessian-vector product using finite-difference approximations at a cost roughly equivalent to two FWI gradient calculations, which involves wavefield propagation as well. The present invention instead replaces the exact Hessian using a PSF-approximated Hessian as described below. Since the PSF-approximated Hessian of the present invention is very sparse and moreover does not need to be recomputed every time, the cost of computing its product with a vector is significantly smaller than computing the product of the exact Hessian and the vector.

SUMMARY OF THE INVENTION

In one embodiment, the invention is a method for inverting measured geophysical data to infer a subsurface model of one or more physical properties, comprising:

(a) using a subsurface property model, computing an objective function measuring misfit between model-simulated data and the measured geophysical data, wherein the model-simulated data are generated using a computer;

(b) computing a gradient of the objective function with respect to parameters of the model;

(c) preconditioning the gradient by multiplying at least one vector by a Hessian matrix, said Hessian matrix resulting from an operator of second derivatives with respect to parameters of the model operating on the objective function, wherein the Hessian matrix is approximated by a banded matrix obtained by neglecting matrix elements in the Hessian matrix that are not close to its diagonals or sub-diagonals according to a selected diagonal-proximity criterion;

(d) using the preconditioned gradient to update the model; and (e) repeating (a)-(d) at least once using the updated model.

In another embodiment, the invention is a second-order optimization method, using both gradient and second derivative operators, for inverting geophysical data to infer a subsurface model of one or more physical properties, comprising:

(a) using a subsurface property model, computing an objective function measuring misfit between model-simulated data and the measured geophysical data, wherein the model-simulated data are generated using a computer;

(b) computing a gradient of the objective function with respect to parameters of the model;

(c) preparing a vector containing isolated point diffractors to sample a Hessian matrix, the Hessian matrix comprising second partial derivatives of the objective function with respect to parameters of the model;

(d) constructing a PSF-approximated Hessian by computing a product of the Hessian matrix and the vector containing isolated point diffractors;

(e) preconditioning the gradient by solving a Gauss-Newton/Newton equation or a subspace equation using the PSF-approximated Hessian; and (f) using the preconditioned gradient to update the model.

A major objective of parameter estimation by data inversion is to use the resulting subsurface model in prospecting for hydrocarbons.

BRIEF DESCRIPTION OF THE DRAWINGS

The present invention and its advantages will be better understood by referring to the following detailed description and the attached drawings in which.

Due to patent law restrictions on the use of color, FIGS. 1A-1B, 2A-2D, 3A-3D, 5A-5C, 6A-6B, and 7A-7D are black-and-white reproductions of color originals. The invention will be described in connection with example embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the scope of the invention, as defined by the appended claims.

DETAILED DESCRIPTION OF EXAMPLE EMBODIMENTS

Approximating the Hessian Using Point-Spread Functions (PSFs)

A method is disclosed below for pre-calculating an approximate Hessian and storing it either in computer hard disk or memory. The approximate Hessian is then retrieved when needed for computing its product with a vector. Since the approximate Hessian is very sparse, its product with a vector is therefore very efficient to calculate. Once the approximate Hessian is computed and stored either in disk or memory, computing its product with a vector requires no simulator calls at all. The pre-calculated approximate Hessian can also be reused in the subsequent steps whenever necessary.

The product of the Hessian and an arbitrary vector a can be expressed as follows:

$$b(x) = \sum_{y} H(x, y) a(y), \quad (5)$$

For the case of Gauss-Newton Hessian using the L2-norm objective function, each component of the Gauss-Newton Hessian can be expressed as follows in the frequency domain:

$$H(x, y) = \sum_{x_s} \sum_{x_r} \sum_{\omega} \left( \frac{\partial d(x_r, x_s, \omega)}{\partial m(x)} \right)^* \frac{\partial d(x_r, x_s, \omega)}{\partial m(y)}, \quad (6)$$

where * denotes taking the matrix adjoint, $x_s$, $x_r$ and $\omega$ are the source location, receiver location and frequency, respectively; $\partial d(x_s, x_s, \omega)/\partial m(x)$ is the sensitivity kernel containing first-order partial derivatives of the simulated data d with respect to model parameter m(x). It is obvious that each component of the Hessian is the correlation of the sensitivity kernel itself, therefore it reaches its maximum when x=y (autocorrelation). For a typical surface seismic acquisition geometry, it is reasonable to assume that the Hessian has the most significant entries when y is close to x, and that when y is far away from x, its contribution is small and hence can be ignored. With this assumption, the equation of Hessian-times-vector can be rewritten as follows:

$$b(x) \approx \sum_{h} H(x, x+h) a(x+h), \quad (7)$$

where h is the distance between x and y. The user selects h, and the selection will represent a trade-off between thorough sampling of one column of the Hessian matrix and simultaneously sampling other columns of the matrix. h can be smaller when the Hessian matrix is more diagonally dominant, and bigger when the matrix is less diagonally dominant. For example, the Hessian tends to be less diagonally dominant for low frequency data compared to high frequency data. Also, the Hessian tends to be more diagonally dominant if the subsurface is well illuminated and less diagonally dominant when it is not. For each model point x, only Hessian elements close to x are used to compute the Hessian-vector product.

This assumption also means each column of the exact Hessian can be approximately extracted by computing the product of the exact Hessian and vector(s) containing isolated point diffractors. (A point diffractor as it is represented in the following equations is a spike with amplitude 1.) This utilizes the fact that the i'th column of the Hessian matrix can be conveniently extracted by computing the product of the Hessian with a vector containing a spike at the i'th element but zeros elsewhere, as illustrated by the following equation:

$$\begin{pmatrix} H_{11} & \cdots & H_{1i} & \cdots & H_{1j} & \cdots & H_{1M} \\ \vdots & \ddots & \vdots & \ddots & \vdots & \ddots & \vdots \\ H_{i1} & \cdots & H_{ii} & \cdots & H_{ij} & \cdots & H_{iM} \\ \vdots & \ddots & \vdots & \ddots & \vdots & \ddots & \vdots \\ H_{j1} & \cdots & H_{ji} & \cdots & H_{jj} & \cdots & H_{jM} \\ \vdots & \ddots & \vdots & \ddots & \vdots & \ddots & \vdots \\ H_{M1} & \cdots & H_{Mi} & \cdots & H_{Mj} & \cdots & H_{MM} \end{pmatrix} \begin{pmatrix} 0 \\ \vdots \\ 1 \\ \vdots \\ 0 \\ \vdots \\ 0 \end{pmatrix} = \begin{pmatrix} H_{1i} \\ \vdots \\ H_{ii} \\ \vdots \\ H_{ji} \\ \vdots \\ H_{Mi} \end{pmatrix}, \quad (8)$$

Similarly, the j'th column of the Hessian matrix can be extracted by using a vector containing a spike at the j'th element but zeros elsewhere as follows:

$$\begin{pmatrix} H_{11} & \cdots & H_{1i} & \cdots & H_{1j} & \cdots & H_{1M} \\ \vdots & \ddots & \vdots & \ddots & \vdots & \ddots & \vdots \\ H_{i1} & \cdots & H_{ii} & \cdots & H_{ij} & \cdots & H_{iM} \\ \vdots & \ddots & \vdots & \ddots & \vdots & \ddots & \vdots \\ H_{j1} & \cdots & H_{ji} & \cdots & H_{jj} & \cdots & H_{jM} \\ \vdots & \ddots & \vdots & \ddots & \vdots & \ddots & \vdots \\ H_{M1} & \cdots & H_{Mi} & \cdots & H_{Mj} & \cdots & H_{MM} \end{pmatrix} \begin{pmatrix} 0 \\ \vdots \\ 0 \\ \vdots \\ 1 \\ \vdots \\ 0 \end{pmatrix} = \begin{pmatrix} H_{1j} \\ \vdots \\ H_{ij} \\ \vdots \\ H_{jj} \\ \vdots \\ H_{Mj} \end{pmatrix} \quad (9)$$

Thanks to the linearity of the problem, if spikes are put at both the i'th and the j'th elements of the vector and zeros elsewhere and the product of the Hessian and this vector is computed, one then gets the sum of the i'th and j'th columns of the matrix as follows:

$$\begin{pmatrix} H_{11} & \cdots & H_{1i} & \cdots & H_{1j} & \cdots & H_{1M} \\ \vdots & \ddots & \vdots & \ddots & \vdots & \ddots & \vdots \\ H_{i1} & \cdots & H_{ii} & \cdots & H_{ij} & \cdots & H_{iM} \\ \vdots & \ddots & \vdots & \ddots & \vdots & \ddots & \vdots \\ H_{j1} & \cdots & H_{ji} & \cdots & H_{jj} & \cdots & H_{jM} \\ \vdots & \ddots & \vdots & \ddots & \vdots & \ddots & \vdots \\ H_{M1} & \cdots & H_{Mi} & \cdots & H_{Mj} & \cdots & H_{MM} \end{pmatrix} \begin{pmatrix} 0 \\ \vdots \\ 1 \\ \vdots \\ 0 \\ \vdots \\ 0 \end{pmatrix} = \begin{pmatrix} H_{1i} \\ \vdots \\ H_{ii} \\ \vdots \\ H_{ji} \\ \vdots \\ H_{Mi} \end{pmatrix} + \begin{pmatrix} H_{1j} \\ \vdots \\ H_{ij} \\ \vdots \\ H_{jj} \\ \vdots \\ H_{Mj} \end{pmatrix} \quad (10)$$

Because the Hessian matrix can be assumed to be diagonal dominant as discussed above, the elements in each column of the matrix that are far away from the diagonal elements are therefore very small, i.e., $H(x, x+h) \approx 0$, when $|h|$ in the physical space is large. So an element, $H_{Id}$, where $k=1, 2, \ldots, M$, in the first column in the right hand side of equation (10), can be neglected if the physical location where the $k^{th}$ element in the 1-D vector space corresponds to (the vector shown in equations (8)-(10) is a 1-D vector, but the physical space is two dimensional for 2-D problems and three dimensional for 3-D problems, so there has to be a mapping from physical space to the 1-D vector space) is relatively far away from the physical location where $i^{th}$ element in the 1-D vector space corresponds to. Similarly, an element, $H_{kj}$, where $k=1, 2, \ldots M$, in the second column in the right hand size of equation (10), can be neglected if the physical location of the $k^{th}$ element in the physical space is relatively far away to the physical location where the $j^{th}$ element in the 1-D vector space corresponds. Equation (10) can then be written as follows:

$$\begin{pmatrix} H_{11} & \ldots & H_{1i} & \ldots & H_{1j} & \ldots & H_{1M} \\ \vdots & \ddots & \vdots & \ddots & \vdots & \ddots & \vdots \\ H_{i1} & \ldots & H_{ii} & \ldots & H_{ij} & \ldots & H_{iM} \\ \vdots & \ddots & \vdots & \ddots & \vdots & \ddots & \vdots \\ H_{j1} & \ldots & H_{ji} & \ldots & H_{jj} & \ldots & H_{jM} \\ \vdots & \ddots & \vdots & \ddots & \vdots & \ddots & \vdots \\ H_{M1} & \ldots & H_{Mi} & \ldots & H_{Mj} & \ldots & H_{MM} \end{pmatrix} \begin{pmatrix} 0 \\ \vdots \\ 1 \\ \vdots \\ 1 \\ \vdots \\ 0 \end{pmatrix} \approx \begin{pmatrix} 0 \\ \vdots \\ \boxed{H_{ii}} \\ \vdots \\ \vdots \\ 0 \end{pmatrix} + \begin{pmatrix} 0 \\ \vdots \\ 0 \\ \vdots \\ \boxed{H_{jj}} \\ \vdots \\ 0 \end{pmatrix} = \quad (11)$$

$$\begin{pmatrix} 0 \\ \vdots \\ \boxed{H_{ii}} \\ \vdots \\ \boxed{H_{jj}} \\ \vdots \\ 0 \end{pmatrix}$$

where the boxes denote the nearby elements whose corresponding physical locations in the physical space are close to the corresponding diagonal elements (where the spikes are located). As can be seen from equation (11), two columns with certain approximations to the exact Hessian matrix have been extracted by computing the product of the exact Hessian and a vector containing two spikes but zeros elsewhere. The two approximate Hessian columns can be obtained by windowing the vector in the right hand side of equation (11) where the two spikes are located. Similarly, more columns of the Hessian matrix can be simultaneously extracted by putting more spikes in the vector used for computing the Hessian-vector product. The distances between these spikes or diffractors determine the maximum number of elements that can be extracted from each column of the Hessian matrix.

Figure 1A:
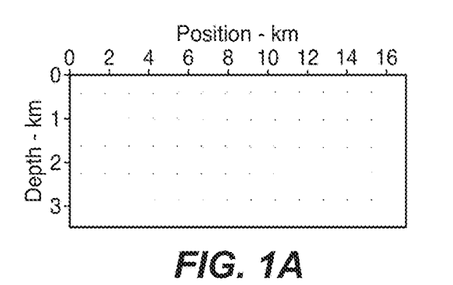
FIG. 1A shows a vector containing isolated point diffractors and FIG. 1B shows the product of the exact Hessian and the vector shown in FIG. 1A.
Figure 1B:
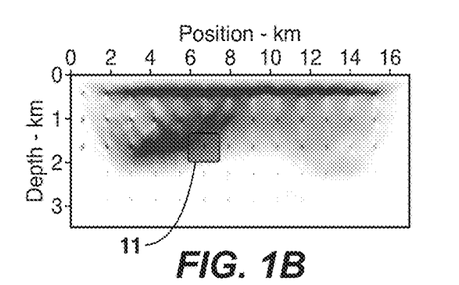

This is illustrated in FIGS. 1A-1B for the case of single parameter inversion for the Marmousi model (Versteeg, 1994), where FIG. 1A is the vector containing isolated point diffractors used to sample the Hessian matrix, and FIG. 1B shows the result after applying the action of the exact Hessian to the vector shown in FIG. 1A. The local window 11 in FIG. 1B represents the selected entries of the Hessian at that particular model point (selected entries for a particular column of the matrix), i.e. a corresponding PSF (see below). PSFs for model points that are not covered by the point diffractors are obtained by interpolation on the fly when needed for computing its action to a vector. Only one window is shown in FIG. 1B, but the windowing is done for each point diffractor shown in the figure. In the case of FIGS. 1A-1B, the horizontal distance between spikes was 1200 m and the vertical distance between spikes was 600 m. For this particular example, the sampling intervals in x and z are both 20 m. So, the maximum window size (or the maximum number of extracted elements in each column of the matrix) for the PSF-approximated Hessian is 61 samples in x and 31 samples in z. In terms of the parameter h in equation (7), the distance between adjacent spikes (diffractors) in FIGS. 1A-1B is 2h. The spacing of the point diffractors may remain the same or may be changed from one iteration of the inversion process to the next.

Figure 8:
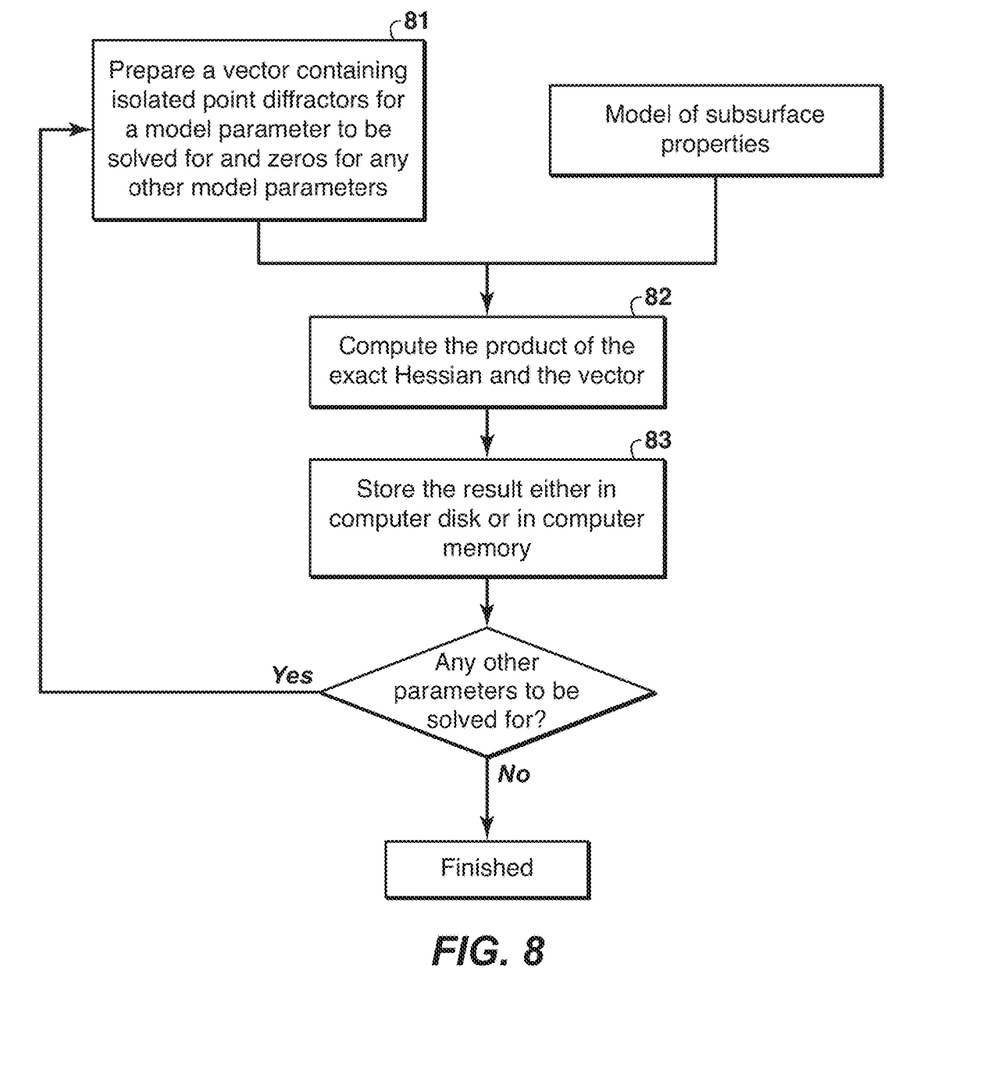
FIG. 8 is a flow chart showing basic steps for building the PSF-approximated Hessian for single parameter or multi-parameter inversion.

Hessian columns that are not covered by the isolated point diffractors can be obtained through interpolation. The response of the exact Hessian to each point diffractor is also known as point-spread function (PSF) (Lecomte, 2008). This approximate Hessian may be referred to hereafter as the "PSF-approximated Hessian." Its computation occurs at step 82 in the invention embodiment of FIG. 8.

For the case of two parameter inversion, it is necessary to compute the Hessian-vector product containing isolated point diffractors twice in order to get the PSF-approximated Hessian, as explained by the following equations.

$$\begin{pmatrix} H_{11} & H_{12} \\ H_{21} & H_{22} \end{pmatrix} \begin{pmatrix} p \\ 0 \end{pmatrix} = \begin{pmatrix} H_{11}p \\ H_{21}p \end{pmatrix}, \quad (12)$$

and $$\begin{pmatrix} H_{11} & H_{12} \\ H_{21} & H_{22} \end{pmatrix} \begin{pmatrix} p \\ 0 \end{pmatrix} = \begin{pmatrix} H_{12}p \\ H_{22}p \end{pmatrix}, \quad (13)$$

where p is the vector containing isolated point diffractors and 0 is a vector containing zeros. By extracting PSFs from $H_{11}p$, $H_{21}p$, $H_{12}p$ and $H_{22}p$, the PSF-approximated Hessian can be built for the entire Hessian matrix, not just the Hessian for the parameter itself ($H_{11}$ and $H_{22}$), but also the Hessian for the cross parameters ($H_{21}$ and $H_{12}$).

Figure 9:
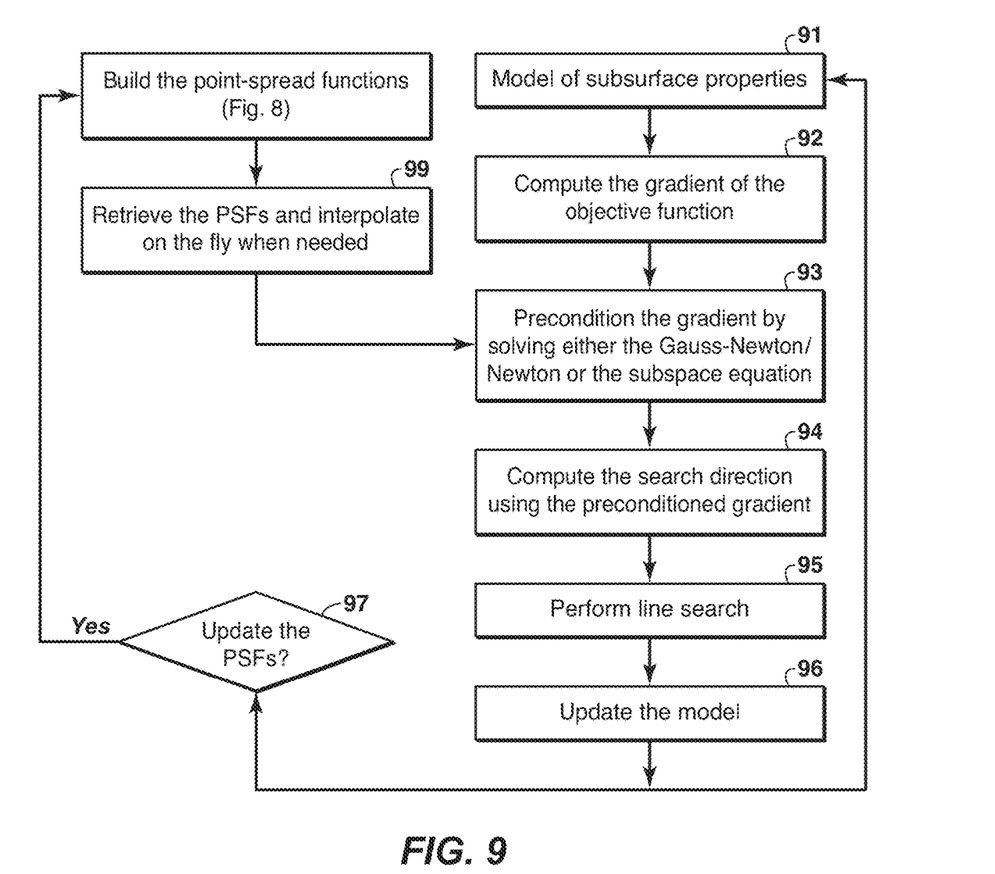
FIG. 9 is a flow chart showing basic steps in one embodiment of the present invention for performing inversion using the PSF-approximated Hessian.

In general, calculating the PSF-approximated Hessian for N parameters requires computing the Hessian-times-vector N times. Once the approximate Hessian or the PSFs are calculated, they can be stored (step 83 in FIG. 8) either in disk or memory and reused (step 99 in FIG. 9) by the second-order approach. The PSF-approximated Hessian can be recalculated at every nonlinear iteration or every several nonlinear iterations.

Practical Considerations and Further Extensions

The PSFs are extracted only at locations where the point diffractors are located. Because these point diffractors are isolated, not every image point has a PSF. In other words, not every column of the Hessian is approximated. This can be easily solved by spatially interpolating the PSFs. The filters are preferably interpolated "on the fly" when needed (step 99 in FIG. 9) to compute its action on a vector. This can significantly reduce the storage requirement for storing the interpolated full Hessian. Any interpolation scheme, such as nearest neighbor interpolation or linear interpolation, can be used to achieve this purpose. One special case of the PSF-approximated Hessian arises when the distances between the isolated point diffractors reduce to zero, then the sampling vector becomes a vector containing ones. Under such circumstance, the computed PSF-approximated Hessian becomes a mass-lumped Hessian, which averages each row of the exact Hessian matrix.

Another important consideration is the symmetry of the PSF-approximated Hessian. Because the exact Hessian, by definition, is symmetric, it is desirable for the approximate Hessian to also be symmetric. However, since each PSF approximates a column of the Hessian matrix, unless each column of the exact Hessian is exactly the same, this approximation cannot guarantee that the PSF-approximated Hessian is symmetric. Following are two different examples of ways to symmetrize the PSF-approximated Hessian. Any other symmetrizing technique that may be found is within the scope of the invention. The first option is to replace the upper half elements of the PSF-approximated Hessian with the lower half elements by flipping up the elements in the lower half along the diagonal line. Or, alternatively, replace the lower half elements with its upper half elements by mirror reflecting the elements in the upper half through the diagonal line to replace the elements in the lower half. The second option is to compute both the product of the PSF-approximated Hessian and a vector and the product of the transpose of the PSF-approximated Hessian and the same vector, and then average the two results together. This effectively symmetrizes the PSF-approximated Hessian by averaging its upper and lower half elements.

The exact Hessian is computed based on current model parameters. In an inversion workflow, the model parameters are updated at the end of each iteration. Therefore, in theory, the Hessian needs to be updated as well when the model parameters are updated to more accurately reflect the curvature information of the objective function. However, if the model updates are not significant after each iteration, it is reasonable to assume that the changes of the Hessian can be neglected, at least for a small number of iterations. Therefore, in some embodiments of the invention, the PSF-approximated Hessian is not recomputed every iteration, but instead, for example, once every several iterations. Another option is to update the PSF-approximated Hessian using a quasi-Newton scheme (Nocedal and Wright, 2000, pages 194-199).

The term "exact Hessian" (also referred to herein as "the Hessian") does not mean that approximations cannot be made. For example, the Lee-Baumstein method (WO 2013/081752) may be used to compute the product of the exact Hessian and the vector of point diffractors.

A method such as that disclosed in the above-discussed WO 2013/081752 approximates the product of the exact Hessian and a vector, e.g. a gradient of the objective function. It does not explicitly compute an approximate Hessian, but instead, it computes the Hessian-vector product in an approximate way. The PSF-approximated Hessian of the present invention, on the other hand, approximates the Hessian itself, and computes explicitly an approximate Hessian. Then this approximate Hessian is used to compute the Hessian-vector product. For purposes of the above terminology distinction between the "Hessian" and the "Hessian-vector product," the term "vector" in "Hessian-vector product" means a vector of the same size as the model parameters, for example the gradient of the objective function. A PSF-approximated Hessian may be built by first computing the product of the exact Hessian and the sampling vector of point diffractors, and then windowing and interpolating. A method such as that disclosed in WO 2013/081752, however, can be used in an embodiment of the present invention to compute the PSF-approximated Hessian, i.e. to perform step 82, because the method of WO 2013/081752 approximates the product of the exact Hessian and a vector, and for this purpose the vector can be the sampling vector of point diffractors.

A typical workflow of using the PSF-approximated Hessian in an inversion framework can be summarized as follows:

1. Prepare vector(s) containing isolated point diffractors—step 81 in FIG. 8.
2. Build the PSF-approximated Hessian by computing the action(s) of the Hessian to vector(s) containing isolated point diffractors—step 82. The subsurface model is needed in this step because this step computes the product of the exact Hessian and the sampling vector, and computing the exact Hessian-vector product requires simulation.
3. Start nonlinear iteration (refer to the flow chart of FIG. 9)
    (a) Compute the gradient of the objective function—step 92.
    (b) Solve the Gauss-Newton/Newton equation or the subspace equation using the PSF-approximated Hessian to get the preconditioned gradient—step 93.
    (c) Find the search direction using the preconditioned gradient—step 94.
    (d) Perform a line search to find an optimal step length—step 95.
    (e) Update the model—step 96.
    (f) Recalculate the PSF-approximated Hessian or update the PSF using a quasi-Newton scheme (optional)—step 97.

Numerical Examples

Figure 2A:
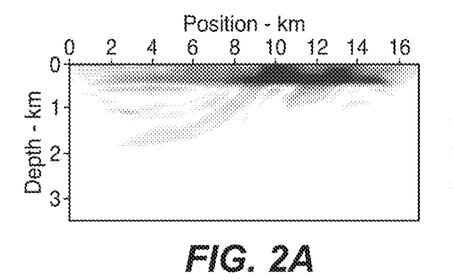
FIG. 2A shows the raw gradient of an FWI objective function.
Figure 2B:
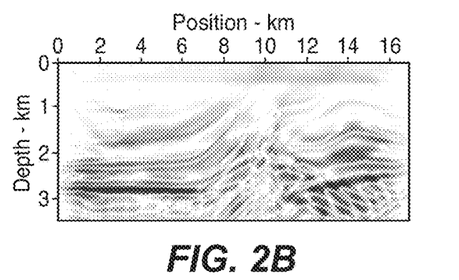
FIGS. 2B-2D show the PSF preconditioned gradients for PSF window sizes of 1×1 samples, 20×20 samples, and 60×30 samples, respectively.
Figure 2C:
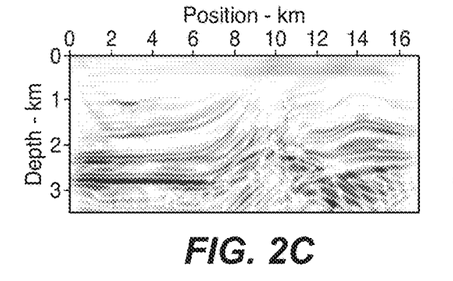
Figure 2D:
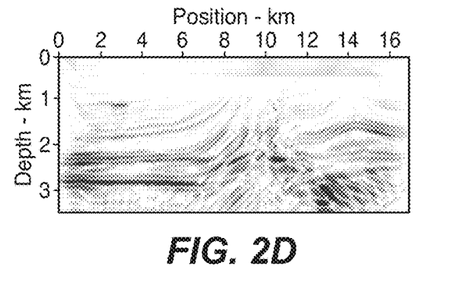
Figure 3A:
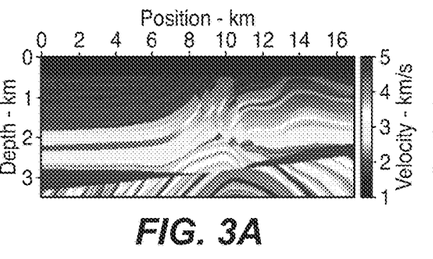
FIG. 3A shows the true Marmousi velocity model, used to generate synthetic data for a test example; the other panels show the inverted model obtained when the gradient is preconditioned with (3B) the PSFs of the present invention, (3C) the z-square gain and (3D) the source illumination.
Figure 3B:
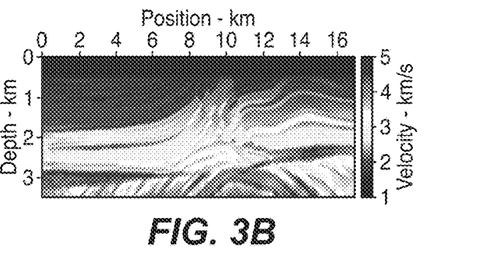
Figure 3C:
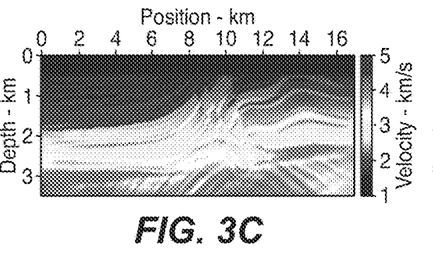
Figure 3D:
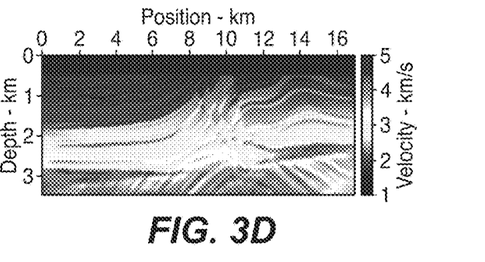
Figure 4:
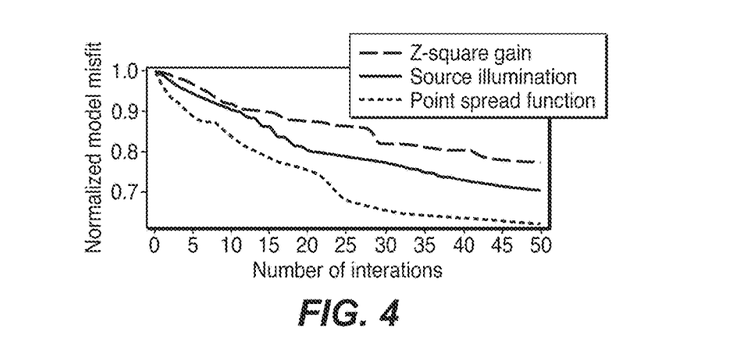
FIG. 4 shows model misfit curves as a function of iterations for different preconditioning schemes, which misfit curves show that preconditioning using the PSF-approximated Hessian of the present invention produces the fastest convergence rate compared to the conventional approaches.

FIG. 1B shows the corresponding PSFs obtained by computing the action of the Hessian to a vector containing isolated point diffractors (FIG. 1A) for the Marmousi model. FIG. 2A shows the raw gradient, and FIGS. 2B-2D are the preconditioned gradients obtained by inverting the Gauss-Newton equation using PSFs with different window sizes. Note that the wider the window size, the stronger the deconvolution effect, i.e., broader spatial frequency content, in the preconditioned gradients. FIG. 3 compares the inversion result using the Marmousi velocity model. Inversion preconditioned using the PSFs (i.e., the present inventive method) gives the fastest convergence rate (see FIG. 4) compared to conventional techniques for preconditioning, i.e., z-square gain of the gradient (scale the gradient by depth squares) and source illumination (the intensity of the source wavefields). It should be noted that the costs of the above three preconditioning schemes are about the same.

The window size, i.e., the choice of h in Eqn. (7), may be used at two different places in the present invention. One is when preparing the point diffractors. In that case, the window size, i.e. h, determines the maximum number of elements in a particular Hessian column that can be extracted when building the PSF-approximated Hessian. The choice of h, however, will not affect the computational efficiency of building the PSF-approximated Hessian at all, because when calling the simulator to compute the product of the exact Hessian and a vector, it always uses the full Hessian (all of its off-diagonal elements). The choice of h affects only the accuracy of the extracted Hessian columns, or PSFs. The second place where the choice of h matters is when the precomputed PSF-approximated Hessian is used to compute the Hessian-vector product. In that case, the maximum h that can be used for computing the Hessian-vector product is the window size that was used in preparing the point diffractors. But smaller window sizes can also be used for computing the Hessian-vector product. A smaller window size results in faster computation of the product of the PSF-approximated Hessian and a vector, because smaller window size means fewer off-diagonal elements of the PSF-approximated Hessian are used in the computation. Naturally, smaller window size results in a less accurate approximation. Thus there is a compromise between accuracy (resolution) and computing speed, but this arises only at the stage when the PSF-approximated Hessian is used for computing the Hessian-vector product, and not when the point diffractors are being prepared.

Figure 5A:
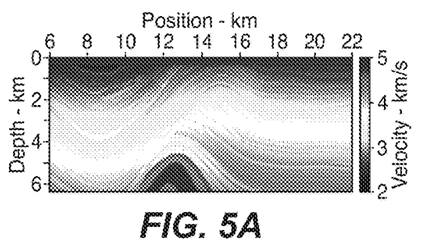
FIGS. 5A-5C show the "true" parameter models used to generate a test example of multi-parameter vertical transverse isotropic ("VTI") inversion, where 5A, 5B and 5C are the models of vertical velocity $v_p$, $\varepsilon$ and $\delta$, respectively.
Figure 5B:
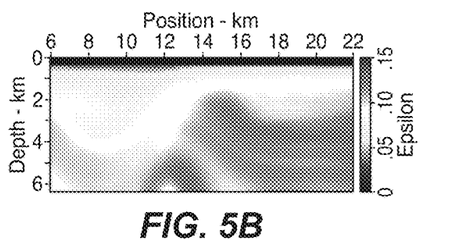
Figure 5C:
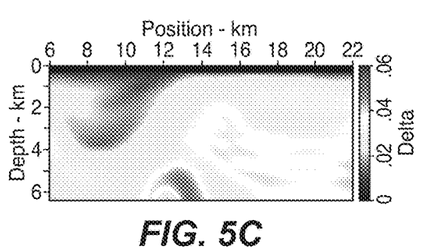
Figure 6A:
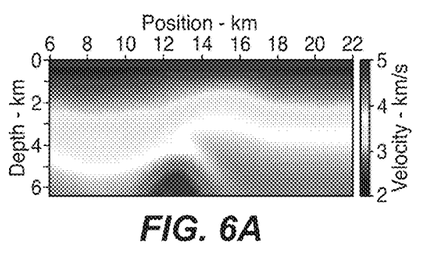
FIGS. 6A-6B show the initial $v_p$ and $\varepsilon$ used for the VTI inversion example (the anisotropy parameter $\delta$ is assumed known and accurate and was kept fixed during inversion)
Figure 6B:
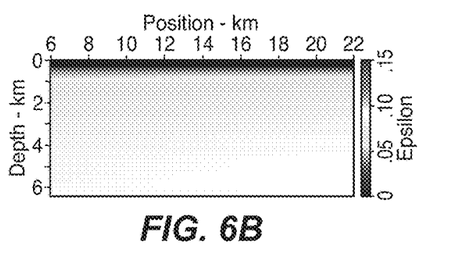
Figure 7A:
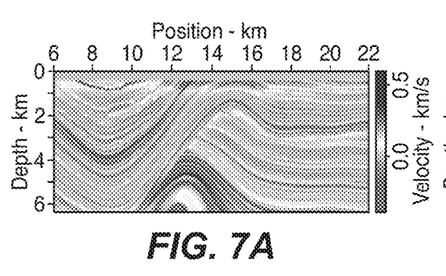
FIG. 7A is the true $v_p$ perturbation, i.e., the difference between the true model shown in FIG. 5A and the initial model in FIG. 6A, and similarly
Figure 7B:
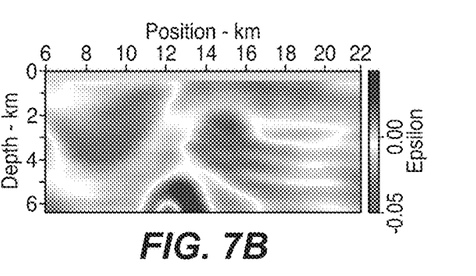
FIG. 7B shows the perturbation from the true model used to create the initial model for $\varepsilon$.
Figure 7C:
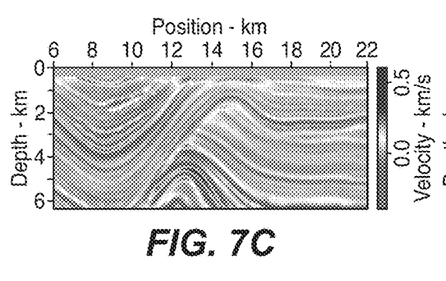
FIG. 7C shows the inverted $v_p$ perturbation, i.e., the difference between the inverted $v_p$ and the initial $v_p$.
Figure 7D:
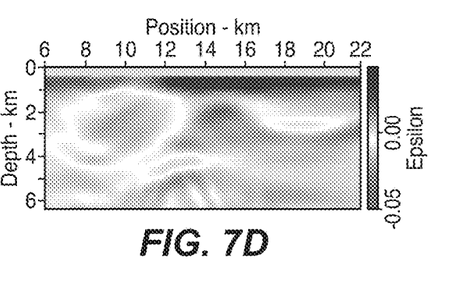
FIG. 7D shows the inverted $\varepsilon$ perturbation, i.e., the difference between the inverted $\varepsilon$ and the initial $\varepsilon$.

A second example illustrates multi-parameter acoustic VTI inversion. In this case, the anisotropy parameter δ is assumed to be known and accurate, and the goal is to simultaneously invert for P-wave velocity $v_p$ and the other anisotropy parameter ε. The subspace approach was used in this example, where the action of the Hessian upon a vector was computed using the PSF-approximated Hessian. FIGS. 5A-5C show the "true" models for $v_p$, ε and δ used to generate the synthetic data. The data are modeled using a constant density acoustic VTI simulator with a marine acquisition geometry with the minimum and maximum offset being 90 m and 12,000 m. A Ricker wavelet with a dominant frequency 10 Hz is used for modeling. 300 shots are modeled with the source sampling being 80 m and receiver sampling being 40 m for each shot. FIGS. 6A and 6B show the initial $v_p$ model ands model used for inversion. The anisotropy parameter δ is assumed to be correct and not updated during inversion. FIGS. 7A-7D show the close comparison between the true perturbations (7A-7B) (the difference between the true models and the initial models) and the inverted perturbations (7C-7D) (the differences between the inverted models and the initial models.). Both parameters get meaningful updates as can be seen from the results. It should also be noted that the cost of this approach is similar to the gradient-only first-order approach and is more efficient than the conventional subspace approach because the exact Hessian-vector product is replaced with more efficient PSF-approximated Hessian-vector product.

The foregoing application is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined in the appended claims. Persons skilled in the art will readily recognize that in preferred embodiments of the invention, at least some of the steps in the present inventive method are performed on a computer, i.e. the invention is computer implemented.

REFERENCES

1. Kennett, B. L. N., M. S. Sambridge, and P. R. Williamson, "Subspace methods for large inverse problems with multiple parameter classes," *Geophysical Journal* 94, 237-247 (1988).
2. Lecomte, I., "Resolution and illumination analyses in PSDM: A ray-based approach," *The Leading Edge* 27, no. 5, 650-663 (2008).
3. Nocedal, J. and S. Wright, *Numerical optimization*, Springer Verlag, 111, 194-199 (2000).
4. Pratt, R. G., C. Shin, and G. J. Hicks, "Gauss-Newton and full Newton methods in frequency-space seismic waveform inversion," *Geophysical Journal International* 133, 341-362 (1998).
5. Tarantola, A., "Inversion of seismic reflection data in the acoustic approximation," *Geophysics* 49, 1259-1266 (1984).
6. Versteeg, R., "The Marmousi experience: Velocity model determination on a synthetic complex data set," *The Leading Edge* 13, 927-936 (1994).
7. Lee and Baumstein, Methods For Approximating Hessian Times Vector Operation In Full Wavefield Inversion, PCT International Application Publication WO 2013/081752 (2013).

The invention claimed is:

1. An iterative method for inverting measured geophysical data to infer a subsurface model of one or more physical properties, comprising:
   (a) using a subsurface property model, computing an objective function measuring misfit between model-simulated data and the measured geophysical data, wherein the model-simulated data are generated using a computer;
   (b) computing a gradient of the objective function with respect to parameters of the subsurface property model;
   (c) preconditioning the gradient by multiplying at least one vector by an approximation of a Hessian matrix, said Hessian matrix resulting from an operator of second derivatives with respect to parameters of the subsurface property model operating on the objective function, wherein the approximation of the Hessian matrix is a plurality of columns, but less than all, sampled from the Hessian matrix, and the approximation of the Hessian matrix is stored in a computer readable storage medium;
   (d) using the preconditioned gradient to update the subsurface property model;
   (e) repeating (a)-(d) at least once using the updated subsurface property model, wherein the approximation of the Hessian matrix is recomputed in some iterations of the steps (a)-(d) or in all iterations of steps (a)-(d); and
   (f) generating a subsurface image from a final updated subsurface property model from step (e) that was obtained with the approximation of the Hessian matrix, wherein the subsurface image identifies a location of structure in earth's subsurface that returned waves to receivers that recorded the geophysical data, and
   wherein (a)-(f) are implemented with a computer.

2. The method of claim 1, wherein the at least one vector is the gradient of the objective function, and the preconditioned gradient is given by $H^{-1}g$, where H is the approximation of the Hessian matrix and g is the gradient of the objective function.

3. The method of claim 1, wherein the one or more physical properties are two physical properties, being a first parameter and a second parameter, and the gradient g of the objective function can be expressed as $$g = \begin{pmatrix} g_1 \\ g_2 \end{pmatrix},$$

where $g_1$ and $g_2$ are the gradients with respect to the first and the second parameter, respectively, and the at least one vector are basis vectors $s_1$ and $s_2$, defined as follows:

$$s_1 = \begin{pmatrix} -g_1 \\ 0 \end{pmatrix}, s_2 = \begin{pmatrix} 0 \\ -g_2 \end{pmatrix},$$

where 0 denotes a vector consisting of zeros; and the preconditioned gradient ($g_{new}$) is given by $$g_{new} = -\alpha s_1 - \beta s_2,$$

where $\alpha$ and $\beta$ are obtained by solving the following 2×2 matrix equation:

$$\begin{pmatrix} s_1^T H s_1 & s_1^T H s_2 \\ s_2^T H s_1 & s_2^T H s_2 \end{pmatrix} \begin{pmatrix} \alpha \\ \beta \end{pmatrix} = - \begin{pmatrix} g^T s_1 \\ g^T s_2 \end{pmatrix},$$

where T denotes matrix transpose, and H is the approximation of the Hessian matrix.

4. The method of claim 1, wherein the approximation of the Hessian matrix H, as it multiplies the at least one vector a, is represented by $$b(x) \approx \sum_h H(x, x+h) a(x+h)$$

where x is a location in model parameter space and the summation over h includes only points close to x as determined by the selected diagonal-proximity criterion.

5. The method of claim 1, further comprising computing a search direction using the preconditioned gradient, and performing a line search along the search direction to update the model.

6. The method of claim 1, further comprising generating the approximation of the Hessian matrix by multiplying a sampling vector of isolated point diffractors with the Hessian matrix.

7. The method of claim 6, wherein the number of physical properties being inverted for is N, and the Hessian matrix is multiplied times the sampling vector containing isolated point diffractors N times.

8. The method of claim 6, wherein the Hessian matrix multiplying a sampling vector of isolated point diffractors is computed by linearized Born modeling followed by adjoint modeling, or by finite-difference approximation.

9. The method of claim 6, wherein distances between neighboring point diffractors is shrunk to zero, and the vector containing isolated point diffractors becomes a vector with all components 1.

10. The method of claim 6, wherein the approximation of the Hessian matrix is used in a subsequent iteration, with interpolation performed on-the-fly as needed.

11. The method of claim 6, wherein spacing of the point diffractors determines degree of sampling of the Hessian matrix, and accordingly the spacing is determined by balancing inversion accuracy against computational efficiency.

12. The method of claim 11, wherein at least one column of the Hessian matrix not sampled by the point diffractors is obtained through interpolation.

13. The method of claim 6, wherein the approximation of the Hessian matrix is obtained by centering a window at each point diffractor and neglecting elements of the Hessian matrix outside the windows, wherein size of the window depends upon the selected diagonal-proximity criterion.

14. The method of claim 1, wherein the approximation of the Hessian matrix is recomputed in only some iterations of the steps (a)-(e).

15. The method of claim 1, wherein the method is performed in time domain, or the geophysical data are transformed to frequency domain and the method is performed in the frequency domain.

16. The method of claim 1, wherein the geophysical data are seismic data, and the steps (a)-(e) are included in full wavefield inversion.

17. The method of claim 1, wherein the one or more physical properties are one or more of a group consisting of: P-wave velocity, S-wave velocity, anisotropy, attenuation, and density.

18. The method of claim 1, further comprising symmetrizing the approximation of the Hessian matrix.

19. A second-order optimization method, using both gradient and second derivative operators, for inverting geophysical data to infer a subsurface model of one or more physical properties, comprising:
   (a) using a subsurface property model, computing an objective function measuring misfit between model-simulated data and the measured geophysical data, wherein the model-simulated data are generated using a computer;
   (b) computing a gradient of the objective function with respect to parameters of the model;
   (c) preparing a vector containing isolated point diffractors to sample a Hessian matrix, the Hessian matrix comprising second partial derivatives of the objective function with respect to parameters of the model;
   (d) constructing a PSF-approximated Hessian by computing a product of the Hessian matrix and the vector containing isolated point diffractors, wherein the PSF-approximated Hessian is stored in a computer readable storage medium;
   (e) preconditioning the gradient by solving a Gauss-Newton/Newton equation or a subspace equation using the PSF-approximated Hessian;
   (f) using the preconditioned gradient to update the model; and
   (g) generating a subsurface image from a final updated subsurface property model from step (f) that was obtained with the PSF-approximated Hessian matrix, wherein the subsurface image identifies a location of structure in earth's subsurface that returned waves to receivers that recorded the geophysical data, and
   wherein (a)-(g) are implemented with a computer.

20. The method of claim 19, further comprising computing a search direction using the preconditioned gradient, and performing a line search along the search direction to update the model.

21. The method of claim 19, further comprising:
   (g) repeating (a)-(f), with or without (d), at least once using the updated model, wherein when (d) is not performed, the PSF-approximated Hessian from a previous iteration is used in (e).

22. The method of claim 1, wherein the multiplying at least one vector by an approximation of the Hessian matrix includes no wavefield propagations.

23. The method of claim 1, further comprising using the subsurface image to prospect for hydrocarbons.

24. The method of claim 19, further comprising using the subsurface image to prospect for hydrocarbons.

* * * * *